June 15, 1971  D. S. ERKFRITZ  3,584,361
MILLING HEAD
Filed April 24, 1969  2 Sheets-Sheet 1
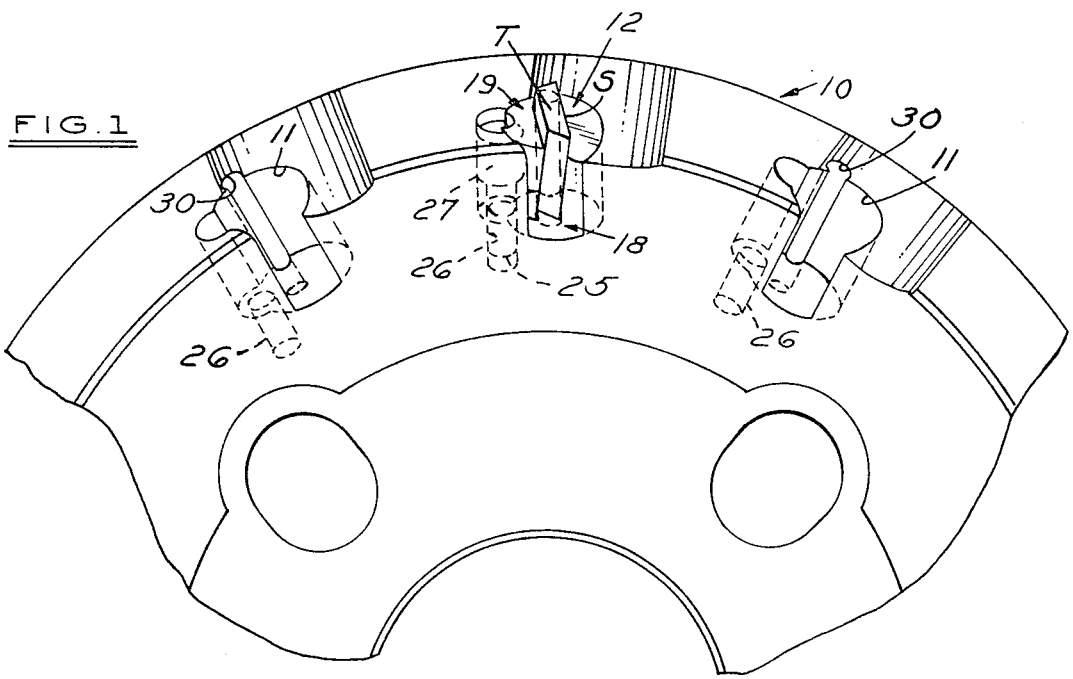
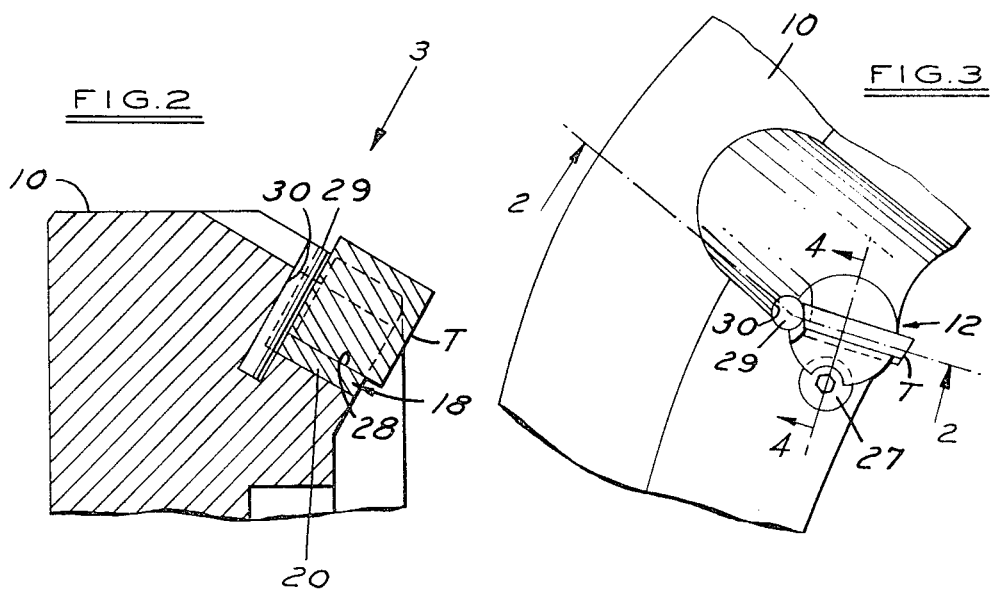
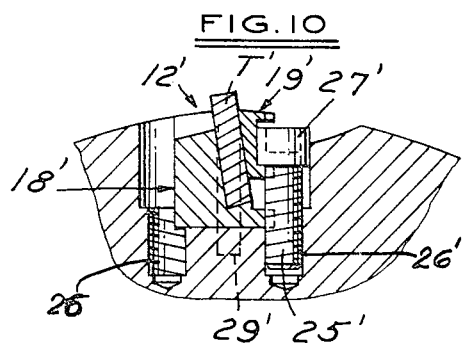
INVENTOR
DONALD S. ERKFRITZ
BY
Barnes, Kisselle,
Raisch & Choate
ATTORNEYS June 15, 1971  D. S. ERKFRITZ  3,584,361
MILLING HEAD
Filed April 24, 1969　　　　2 Sheets-Sheet 2
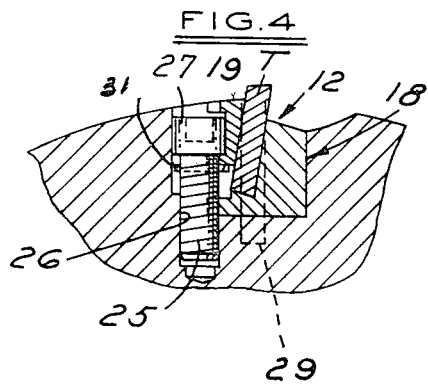
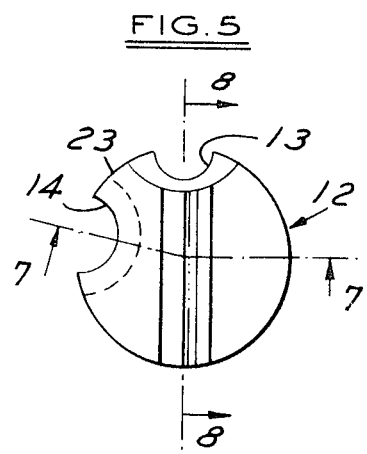
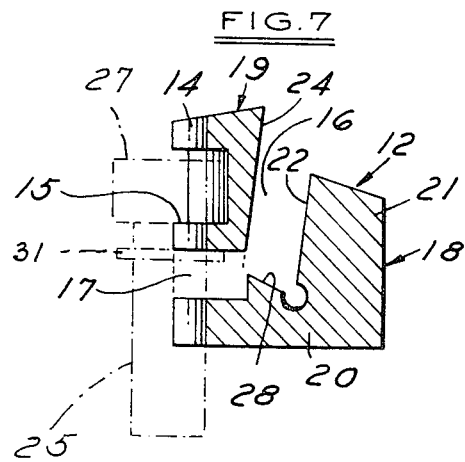
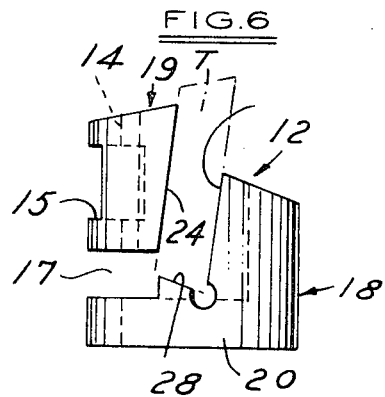
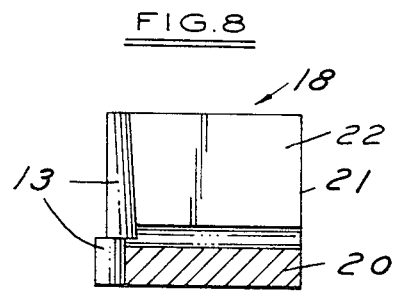
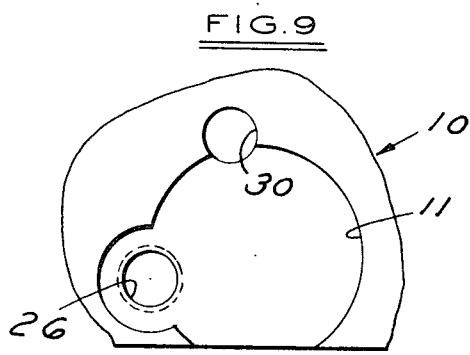
INVENTOR
DONALD S. ERKFRITZ
BY
Barnes, Kisselle,
Raisch & Choate
ATTORNEYS 3,584,361
MILLING HEAD
Donald S. Erkfritz, Rockford, Ill. assignor to Progressive
 Welder & Machine Co., Pontiac, Mich.
Filed Apr. 24, 1969, Ser. No. 818,875
Int. Cl. B26d 1/12
U.S. Cl. 29—105                              20 Claims

ABSTRACT OF THE DISCLOSURE

A milling head comprising a plurality of circumferentially spaced recesses in which inserts are positioned. The inserts are formed into two parts between which a tool is clamped. One of the parts is adapted to wedge the tool against the other part.

---

This invention relates to milling heads.

Among the objects of the invention are to provide a milling head which will accurately locate tools with respect to the axis of the head; wherein the angle of the tool with respect to the axis can be readily changed; which utilizes a novel insert for holding the tool; and which insert can be readily made quickly and economically.

Basically, the invention comprises a plurality of circumferentially spaced recesses in which inserts are positioned. The inserts are formed into two parts which have surfaces between which the tool is clamped. Each insert part has portions conforming to the shape of the recess. One of the parts is adapted to wedge the tool against the other part.

DESCRIPTION OF THE DRAWINGS

FIG. 1 is a fragmentary plan view of the milling head embodying the invention, parts being broken away.

FIG. 2 is a fragmentary sectional view taken along the lines 2—2 in FIGS. 1 and 3.

FIG. 3 is a fragmentary view taken in the direction of the arrow 3 in FIG. 2.

FIG. 4 is a fragmentary sectional view taken along the line 4—4 in FIG. 3.

FIG. 5 is a plan view of a portion of the milling head.

FIG. 6 is an elevational view of the portion of the milling head shown in FIG. 5.

FIG. 7 is a sectional view taken along the line 7—7 in FIG. 5.

FIG. 8 is a sectional view taken along the line 8—8 in FIG. 5.

FIG. 9 is an end view of a portion of the milling head with parts removed.

FIG. 10 is a sectional view similar to FIG. 4 of a modified form of the invention.

DESCRIPTION

Referring to FIG. 1, milling head 10 embodying the invention is adapted to be mounted for rotation about its axis on a milling machine in accordance with conventional practice. Milling head 10 comprises a plurality of cylindrical recesses 11 which have their axes forming an acute angle to the axis of the head 10.

Each recess 11 is adapted to support a tool T having substantially uniform thickness and which is generally rectangular in shape to define cutting surfaces S. The tool can have other non-circular configurations such as hexagonal, octagonal and the like. Each tool T is supported within a recess 11 in fixed relation by an insert 12. As shown in FIGS. 5–7, insert 12 is made from a body of metal which has a cylindrical exterior surface. The body is first formed with semi-cylindrical axially extending grooves 13, 14 and a shoulder 15. The body is further formed with a slot 16 of uniform thickness. A portion of the body is then sawed away as at 17 to thereby form two insert parts 18, 19. Part 18 includes a base 20 having a cylindrical cross section except for the portion 15 that is cut away and an axially extending portion 21, the outer periphery of which is part cylindrical. Portion 21 has a flat tool-engaging surface 22. The second part 19 similarly has an outer part cylindrical surface 23 and a flat tool-engaging surface 24.

Since the axis of the slot 16 that is formed is at an angle, the part 19 thus forms a wedge. A screw 25 is adapted to be threaded in an opening 26 in milling head 10 and has a head 27 that engages the shoulder 15 of part 19 thereby urging the part axially downwardly as viewed in FIG. 4 to clamp the tool T. Part 18 further includes a second tool-engaging surface 28 that is complementary to and engages the base of the tool T.

In addition, a cylindrical pin 29 is provided in recess 13 as well as a complementary recess 30 in the body 10 to locate the insert 12 circumferentially and prevent its rotation. In order to facilitate assembly and handling, a retaining ring 31 is welded on part 19 and holds the screw 25 in assembled relation to part 19.

In the form of the invention shown in FIGS. 1–9, the tool T comprises a positive geometry cutter.

By substituting an insert having the slot which defines surfaces 22, 24 at a different angle to the axis of the insert or with a surface 28 at a different slope as viewed in FIG. 2, accommodation may be made for a tool with differing positive and negative rake angles.

Specifically, as shown in FIG. 10, an additional opening 26' is provided in the milling head and an insert 12' is supported therein by a screw 25'. The insert 12' is formed into parts 18', 19' as in the previous form of the invention, except that the surfaces which define the slot for receiving the tool T' are at a different angle, herein shown as negative geometry. By retaining the opening 26, the insert 12' can be replaced by an insert 12 to produce the positive geometry. It can be appreciated that although the cutter has been shown as insertable from the side, the axis of opening 11 can be changed so that the cutter is insertable from the face.

I claim:

1. In a milling head, the combination comprising
a body,
said body having a plurality of circumferentially spaced recesses therein,
each said recess forming an angle with the axis of the body,
each said recess having a substantially uniform cross section,
an insert in each said recess,
said insert comprising a first part having a base with a cross section corresponding substantially to the cross section of the recess and a portion extending axially from said base,
said last-mentioned portion having a tool-engaging surface and a peripheral surface corresponding in configuration to a portion of the recess and engaging said portion of said recess,
said insert comprising a second part having a tool-engaging surface and a peripheral surface corresponding to the shape of another portion of the recess and engaging said other portion of said recess,
a tool between the surfaces of the first part and second part of said insert,
said tool engaging surface of said second part and the corresponding surface of said tool extending at an angle to the axis of said recess, and
means extending generaly axially and engaging said body and said second part for holding said second part against said tool in clamped wedging relation.

2. The combination set forth in claim 1 wherein said tool-engaging surfaces of said first and second parts are substantially flat and parallel to one another, said tool having complementary flat engaging surfaces.

3. The combination set forth in claim 2 wherein said recesses are cylindrical in cross section.

4. The combination set forth in claim 1 wherein the plane of said tool-engaging surface of the first part is inclined with respect to the axis of said insert.

5. The combination set forth in claim 1 wherein said means engaging said second insert part comprises a shoulder on said second insert part and a screw having a flange engaging said shoulder and threaded into said body.

6. The combination set forth in claim 1 including means circumferentially locating said insert with respect to said body.

7. The combination set forth in claim 6 wherein said last-mentioned means comprises a member, said body and said first insert part having portions thereof engaged by said member to circumferentially locate said insert.

8. The combination set forth in claim 7 wherein said member comprises a cylindrical pin, said engaged portions comprising cylindrical grooves.

9. For use on a milling head comprising a body, said body having a plurality of circumferentially spaced recesses therein, each said recess forming an angle with the axis of the body, and having a substantially uniform cross section, an insert adapted to be positioned in one of said recesses, said insert comprising a first part having a base with a cross section corresponding substantially to the cross section of the recess in which it is to be positioned and a portion extending axially from said base, said last-mentioned portion having a tool-engaging surface and a peripheral surface corresponding in configuration to a portion of the base of the insert, said insert comprising a second part having a tool-engaging surface and a peripheral surface corresponding to the shape of another portion of the base of the insert, said tool engaging surface of said second part extending at an angle to the axis of said recess, said second part having a portion thereof which is adapted to be engaged for holding said second part against said tool in wedging relation.

10. The combination set forth in claim 9 wherein said tool-engaging surfaces of said first and second parts are substantially flat and parallel to one another.

11. The combination set forth in claim 10 wherein said base of said insert is cylindrical.

12. The combination set forth in claim 9 wherein the planes of said tool-engaging surfaces are inclined with respect to the axis of said insert.

13. The combination set forth in claim 9 wherein said portion of said second insert part comprises a shoulder on said second insert part.

14. The combination set forth in claim 9 including means circumferentially locating said insert with respect to said body.

15. The combination set forth in claim 14 wherein said last-mentioned means comprises a member, said body and said first insert part having portions thereof engaged by said member to circumferentially locate said insert.

16. The combination set forth in claim 15 wherein said member comprises a cylindrical pin, said engaged portions comprising cylindrical grooves.

17. In a milling head, the combination comprising a body, said body having a plurality of circumferentially spaced cylindrical recesses therein, each said recess forming an angle with the axis of the body, an insert in each said recess, said insert comprising a first part having a substantially cylindrical base with a cross section corresponding to the cross section of the recess and a portion extending axially from said base, said last-mentioned portion having a flat tool-engaging surface and a part cylindrical peripheral surface corresponding in configuration to a portion of the cylindrical recess and engaging said portion of said recess, said insert comprising a second part having a flat tool-engaging surface and a part cylindrical peripheral surface corresponding to the shape of another portion of the recess and engaging said other portion of said recess, the planes of said tool-engaging surfaces being inclined with respect to the axis of said insert, means circumferentially locating said insert with respect to said body, a tool between the flat surfaces of the first part and second part of said insert, and means extending axially and engaging said body and said second part for holding said second part against said tool in clamped wedging relation.

18. The combination set forth in claim 17 wherein said means engaging said second insert comprises a shoulder on said second insert and a screw having a flange engaging said shoulder and threaded into said body.

19. The combination set forth in claim 17 wherein said insert locating means comprises a member, said body and said first part of said insert having portions thereof engaged by said member to circumferentially locate said insert.

20. The combination set forth in claim 19 wherein said member comprises a cylindrical pin, said engaged portions comprising cylindrical grooves.

References Cited

UNITED STATES PATENTS

| 2,664,617 | 1/1954 | Kralowetz | 29—105 |
| 2,751,663 | 6/1956 | Leuzinger | 29—105 |
| 3,027,624 | 4/1962 | Payne | 29—105 |
| 3,363,299 | 1/1968 | Gowanlock | 29—105 |

FOREIGN PATENTS

| 858,089 | 1/1961 | Great Britain. |
| 580,979 | 8/1959 | Canada. |
| 6709908 | 1/1968 | Netherlands. |

HARRISON L. HINSON, Primary Examiner